(12) United States Patent

Lunde et al.

(10) Patent No.: US 12,559,208 B2

(45) Date of Patent: Feb. 24, 2026

(54) WORK PLATFORM FOR PERFORMING A CABLE OPERATION ON A VESSEL DECK

(71) Applicant: NEXANS, Courbevoie (FR)

(72) Inventors: Johannes Lunde, Bekkestua (NO); Ola Ystgaard, Oslo (NO)

(73) Assignee: NEXANS, Courbevoie (FR)

( * ) Notice: Subject to any disclaimer, the term of this patent is extended or adjusted under 35 U.S.C. 154(b) by 118 days.

(21) Appl. No.: 18/544,986

(22) Filed: Dec. 19, 2023

(65) Prior Publication Data

US 2024/0227991 A1     Jul. 11, 2024

(30) Foreign Application Priority Data

Dec. 19, 2022     (EP) .................................... 22306933

(51) Int. Cl.
B63B 35/04        (2006.01)
F16L 1/20         (2006.01)

(52) U.S. Cl.
CPC ............. B63B 35/04 (2013.01); F16L 1/202 (2013.01)

(58) Field of Classification Search
CPC ..... F16L 1/14; F16L 1/16; F16L 1/202; B63B 35/04; B63B 35/03
See application file for complete search history.

(56) References Cited

U.S. PATENT DOCUMENTS 4,340,322 A     7/1982  Springett et al.
4,591,294 A *   5/1986  Foulkes ............... B23K 9/0286
                                                   405/169

5,624,207 A *   4/1997   Berges ................... B63B 35/04
                                                   226/181
7,649,803 B2 *  1/2010   Ray ......................... G01V 1/18
                                                   405/173
7,913,944 B1 *  3/2011   Lombardi .............. B63B 35/04
                                                   242/563.2
8,328,467 B2 * 12/2012   Thompson ........... G01V 1/3852
                                                   405/169

(Continued)

FOREIGN PATENT DOCUMENTS

WO        2018/132009        7/2018
WO        2018/217081        11/2018
WO     WO-2018217081 A1 * 11/2018 ............. B63B 35/04

OTHER PUBLICATIONS

European Search Report dated Jun. 7, 2023.

(Continued)

*Primary Examiner* — Benjamin F Fiorello

(74) *Attorney, Agent, or Firm* — CANTOR COLBURN LLP

(57)                ABSTRACT

A work platform (10) for performing a cable operation on a cable on a vessel having a vessel deck (7) has chutes (19a, 19b) for guiding the cable from the sea and onto the work platform (10), an overboarding system (18) and a number of modules (11, 12, 13, 14, 15). Each module (11, 12, 13, 14, 15) has a deck section and a support structure for supporting the deck section at a distance above the vessel deck (7). Each module (11, 12, 13, 14, 15) is configured to be lifted separately onto and away from the vessel deck (7). The deck sections of the modules together form a mezzanine deck on which the cable operation is performed. The overboarding system (18) is secured to the mezzanine deck. At least some of the equipment for performing the cable operation is stored below the mezzanine deck.

15 Claims, 16 Drawing Sheets

(56)     References Cited

U.S. PATENT DOCUMENTS

| | | | | |
|---|---|---|---|---|
| 9,784,873 | B2 * | 10/2017 | Rokkan | B65G 67/60 |
| 10,989,827 | B2 * | 4/2021 | Swinford | G01V 1/3817 |
| 2008/0170911 | A1 * | 7/2008 | Snowdon | F16L 1/18 |
| | | | | 405/166 |
| 2010/0021237 | A1 * | 1/2010 | Willis | B63B 35/03 |
| | | | | 405/166 |
| 2015/0316174 | A1 * | 11/2015 | Inbona | B63B 35/03 |
| | | | | 405/167 |
| 2015/0362091 | A1 * | 12/2015 | Roodenburg | B63B 35/03 |
| | | | | 405/168.4 |
| 2016/0084407 | A1 * | 3/2016 | Cowie | F16L 3/16 |
| | | | | 405/170 |
| 2019/0257445 | A1 * | 8/2019 | Case | F16L 1/14 |

OTHER PUBLICATIONS

Ulsetein: "Why is the X-BOW particularly well suited for Cable laying vessels?"Dec. 16, 2021 (Dec. 16, 2021), pp. 1-7, XP093052652, Retrieved from the Internet: URL:https://ulstein.com/news/why-is-the-xbow- particularly-well-suited-for-cable-laying-vessels [retrieved on Jun. 7, 2023].

* cited by examiner

11

11a

D1

D2

11i

24

14

14o

14a

14i

D1

14c

14b

24

WORK PLATFORM FOR PERFORMING A CABLE OPERATION ON A VESSEL DECK

RELATED APPLICATIONS

This application claims the benefit of European Patent Application No. 22 306 933.7, filed on Dec. 19, 2022, the entirety of which is incorporated by reference.

TECHNICAL FIELD

The present invention relates to a work platform for performing a cable operation on a cable on a vessel having a vessel deck. In particular, the work platform comprises number of modules, configured to be lifted separately onto and away from the vessel deck.

BACKGROUND

In prior art, special-purpose vessels for performing cable operations are known. Most of these vessels are occupied with performing cable operations that has been planned in advance for a long time. Hence, these vessels are typically not available to perform an urgent cable operation, for example to repair a cable that has been damaged by a trawl etc.

One alternative would be to have an extra special-purpose vessel on standby in case there is a need to carry out a cable operation within a very short time. This is very expensive.

One purpose of the present invention is to reduce the time for preparing a vessel in order to carry out a cable operation.

SUMMARY OF THE INVENTION

The present invention relates to a work platform for performing a cable operation on a cable on a vessel having a vessel deck, wherein the work platform is comprising:
- chutes for guiding the cable from the sea and onto the work platform, wherein the chutes are provided in a first end of the work platform;
- an overboarding system;
- a number of modules, wherein each module comprises a deck section and a support structure for supporting the deck section at a distance above the vessel deck, wherein each module is configured to be lifted separately onto and away from the vessel deck;
- wherein the deck sections of the modules together form a mezzanine deck on which the cable operation is performed;
- wherein the overboarding system is secured to the mezzanine deck;
- wherein at least some of the equipment for performing the cable operation is stored below the mezzanine deck.

As used herein, the term "equipment" is referring to tools, spare parts, cable handling equipment etc. which are required to perform the cable operation.

As used herein, the term "cable operation" is referring to any type of operation performed on a cable, such as subsea cable cutting, cable recovery, cable joining operation for joining two cable sections, overboarding of joint and lay of cable and joint on the seabed, a cable repair operation for repairing a cable, lay of new cable, pull-in operations etc.

As used herein, the term "deck" is a floor or surface on which persons may move on the vessel, and on which equipment can be placed.

As used herein, the term "overboarding" refers to the operation of transporting a cable from the sea to a vessel and/or to the operation of transporting a cable from a vessel to the sea. Typically, the cable is transferred between the seabed and the vessel. An overboarding system is therefore a system for performing such an overboarding operation.

In one aspect, one of the modules is a tensioner module comprising a tensioner lift and equipment in the form of a cable tensioner, wherein the tensioner lift is configured to lift the cable tensioner between a position above the deck section of the tensioner module and a position below the deck section of the tensioner module.

Hence, when not in use, the tensioner can be removed from the mezzanine deck in an efficient way to free up space on the mezzanine deck.

In one aspect, one of the modules is a first storage module in which at least some of the equipment is storable below the deck section of the first storage module.

In one aspect, the first storage module is located adjacent to a second one of the chutes.

In one aspect, one of the modules is a second storage module in which at least some of the equipment is storable below the deck section of the second storage module.

In one aspect, the second storage module is located adjacent to a first one of the chutes.

There are two purposes of the storage modules. The first one is to store equipment below their deck sections. The second one is to enlarge the area of the mezzanine deck so that cable operations can be performed on the mezzanine deck.

In one aspect, the first and/or second storage module comprises a container in which equipment can be stored. The container can be a tailor-made container adapted to the storage module, or it can be a standardized container. The container may be a shipping container.

In one aspect, one of the modules is a lift module comprising a lift, wherein the lift is configured to lift equipment below the mezzanine deck between a position above the deck section of the lift module and a position below the deck section of the lift module.

In one aspect, the lift module also comprises a storage container in which at least some of the equipment is stored below the deck section of the lift module, wherein the lift is configured to lift equipment stored in the container of the lift module between a position above the deck section of the lift module and a position below the deck section of the lift module.

In one aspect, the lift module is configured to lift the container of the first storage module, of the second storage module or of the lift module between a position above the deck section of the lift module and a position below the deck section of the lift module.

In one aspect, at least some of the modules comprise an internal floor at a distance below the deck section of the respective module, wherein the internal floors together form a protected lower deck below the mezzanine deck.

In one aspect, equipment and containers are movable on the protected lower deck between the first and/or second storage modules and the lift module.

In one aspect, the first storage module is located between the lift module and the chutes.

In one aspect, the second storage module is located between the tensioner module and the chutes.

In one aspect, the work platform comprises winches; and wherein one of the modules is a winch module comprising a winch support for supporting at least one of the winches in a position below the deck section of the winch module, wherein the winch module is located in a second end of the work platform opposite of the first end.

In one aspect, the winch module comprises the winches. Alternatively, the winches are configured to be lifted separately into and away from the winch support of the winch module. In one aspect, the winch module comprises three winches.

In one aspect, three of the modules are winch modules, wherein each winch module comprises a winch support and a winch supported by the winch support in a position below the deck section of the respective winch module.

In one aspect, the overboarding system comprises:

a cable handling bow connected to a winch wire of a first one of the winches;

a tilting device comprising a base frame supported on the mezzanine deck and a bow supporting frame pivotably connected to the base frame; wherein the bow supporting frame comprises a sheave; wherein a winch wire of the first winch is configured to be guided between the cable handling bow and the first one of the winches via the sheave.

In one aspect, the winch support comprises a sheave for each winch for routing winch wires from the respective winches to the mezzanine deck.

In one aspect, the first one of the winches may be used to operate the overboarding system.

In one aspect, the second one of the winches may be used to lift an end of a first cable section from the sea and up to the mezzanine deck via the first one of the chutes. In one aspect, the winch may be used to lift an end of a first cable section up to the tensioner module.

In one aspect, the third one of the winches may be used to lift an end of a second cable section from the sea and up to the mezzanine deck via the second one of the chutes. In one aspect, the third winch may be used to lift an end of a first cable section up to the lift module.

In one aspect, the winch module is located adjacent to the lift module and the tensioner module.

In one aspect, the work platform is comprising: an additional module comprising a deck section and a support structure for supporting the deck section at a distance above the vessel deck, wherein the additional module is configured to be lifted separately onto and away from the vessel deck; and wherein the deck section of the additional module together with the other deck sections form the mezzanine deck on which the cable operation is performed.

Similar to the storage modules, there are two purposes of the additional module. The first one is to store equipment below its deck section. The second one is to enlarge the area of the mezzanine deck so that cable operations can be performed on the mezzanine deck. The additional module is needed when oil-filled cables are joined, as this operation requires a larger area than other operations.

In one aspect, the additional module is located between the winch module and the lift module and between the winch module and the tensioner module.

In one aspect, the work platform comprises two additional modules. Alternatively, the work platform comprises one single additional module, or more than two additional modules.

In one aspect, the first storage module or the second storage module comprises a crane mounted to its deck section.

In one aspect, the crane is configured to lift equipment between the lift module to other locations on the mezzanine deck.

In one aspect, at least some of the modules comprise a stair allowing persons to move between the mezzanine deck and the lower deck.

In one aspect, the equipment comprises cable rollers for supporting the cable at a working height above the mezzanine deck.

In one aspect, the chutes are extending over a side of the vessel. Hence, the first end of the work platform is located at the side of the vessel.

In one aspect, the chutes are extending over an aft side of the vessel. Hence, the first end of the work platform is located at the aft side of the vessel.

In one aspect, a central longitudinal axis of the work platform is defined as the central axis between the first end and the second end of the work platform. In one aspect, the lift module and the tensioner module are provided opposite of each other on each side of the central longitudinal axis.

In one aspect, the support structure of each module is connected to adjacent modules.

In one aspect, the support structure of each module is connectable to, or securable to, the vessel deck.

In one aspect, the work platform is considered to be in an operational state when installed on the vessel deck. In the operational state, the work platform can be used to perform the cable operation on the cable when the vessel is on sea.

In one aspect, the work platform is considered to be in a standby state, different from the operational state, when the modules are stored separately from each other on a land-based facility.

According to the above, equipment can be stored within each module in the standby state and be elevated onto the vessel deck in relatively shorter time. In addition, as equipment can be stored within each module below the module deck sections, the footprint of the work platform is relatively small, enabling a larger number of vessels to be used for such cable operations.

According to the above, due to the winch module, a vessel with a crane for operating the overboarding system is not required. Hence, a larger number of vessels can be used for such cable operations.

BRIEF DESCRIPTION OF THE DRAWINGS

Embodiments of the present invention will now be described in detail with reference to the enclosed drawings, wherein.

DETAILED DESCRIPTION

Figure 9:
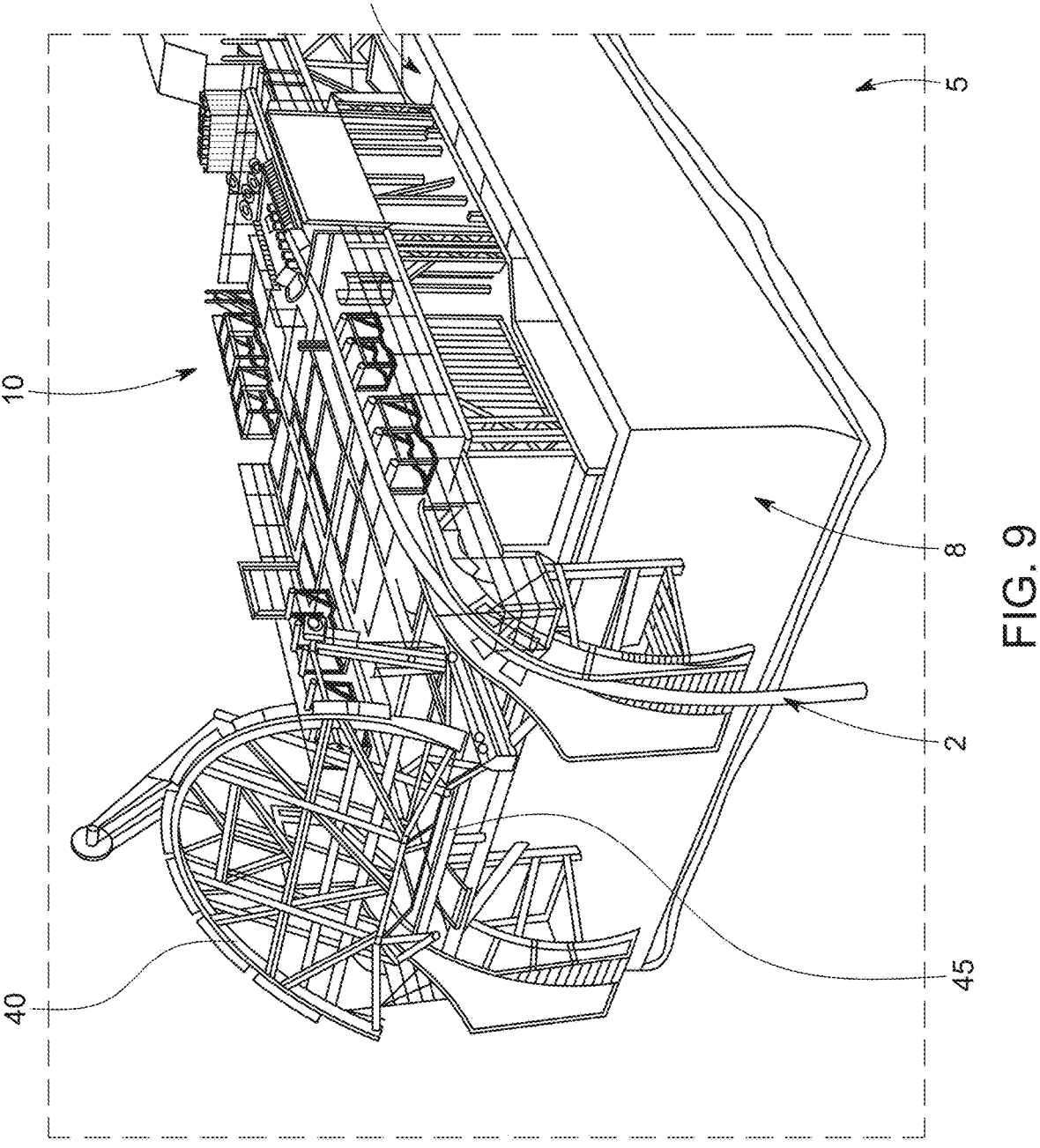
FIG. 9 illustrates the work platform installed on a vessel.

Initially, it is referred to FIG. 9, where the aft section of a vessel 5 is shown. The vessel comprises a vessel deck 7 on which a work platform 10 is installed. It is further shown that a cable 2 is guided from the sea and to the work platform 10. The aft side of the vessel 5 is indicated with reference number 8.

Figure 1:
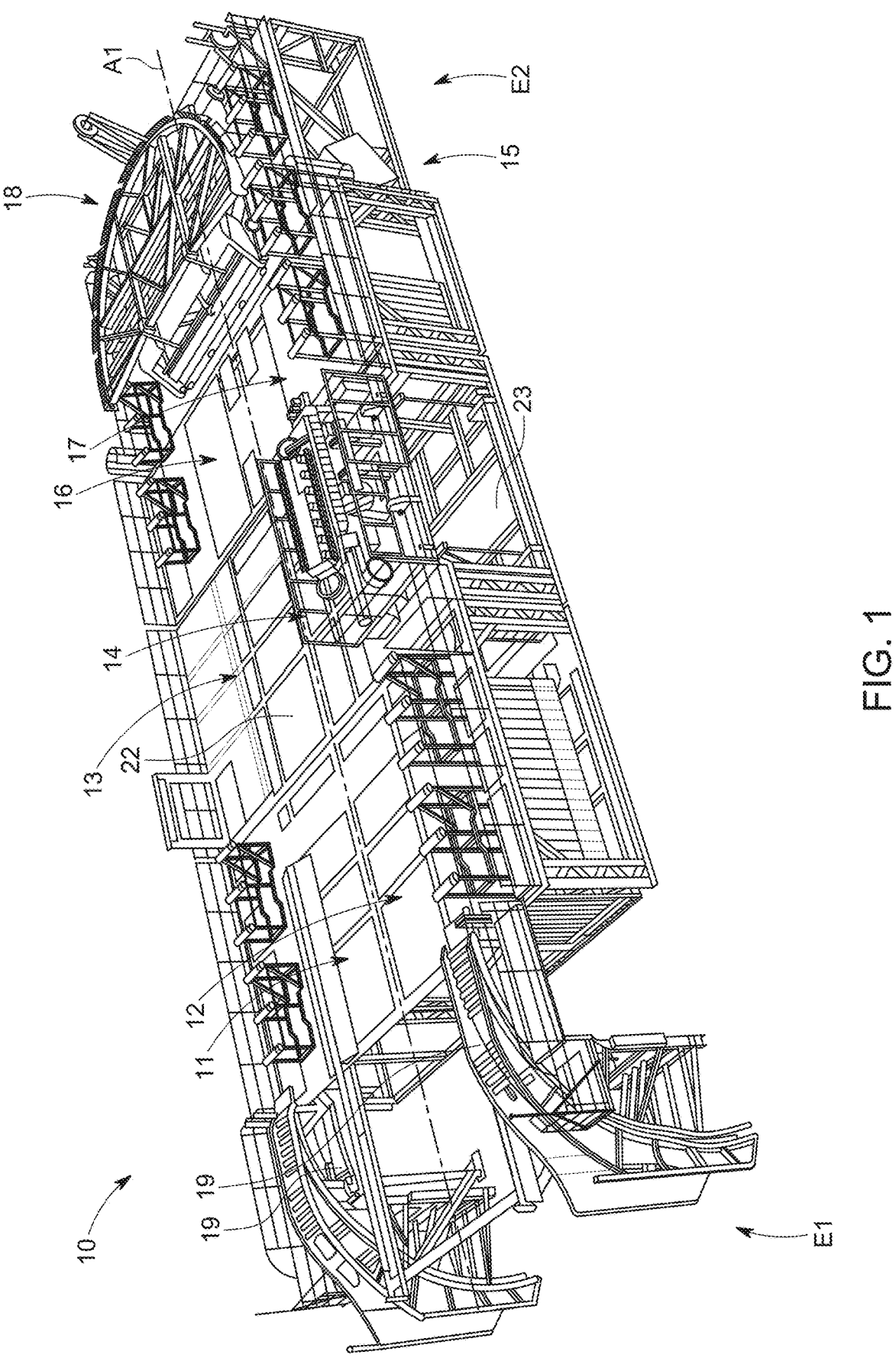
FIG. 1 illustrates a perspective view from above of a first embodiment of the work platform.
Figure 2:
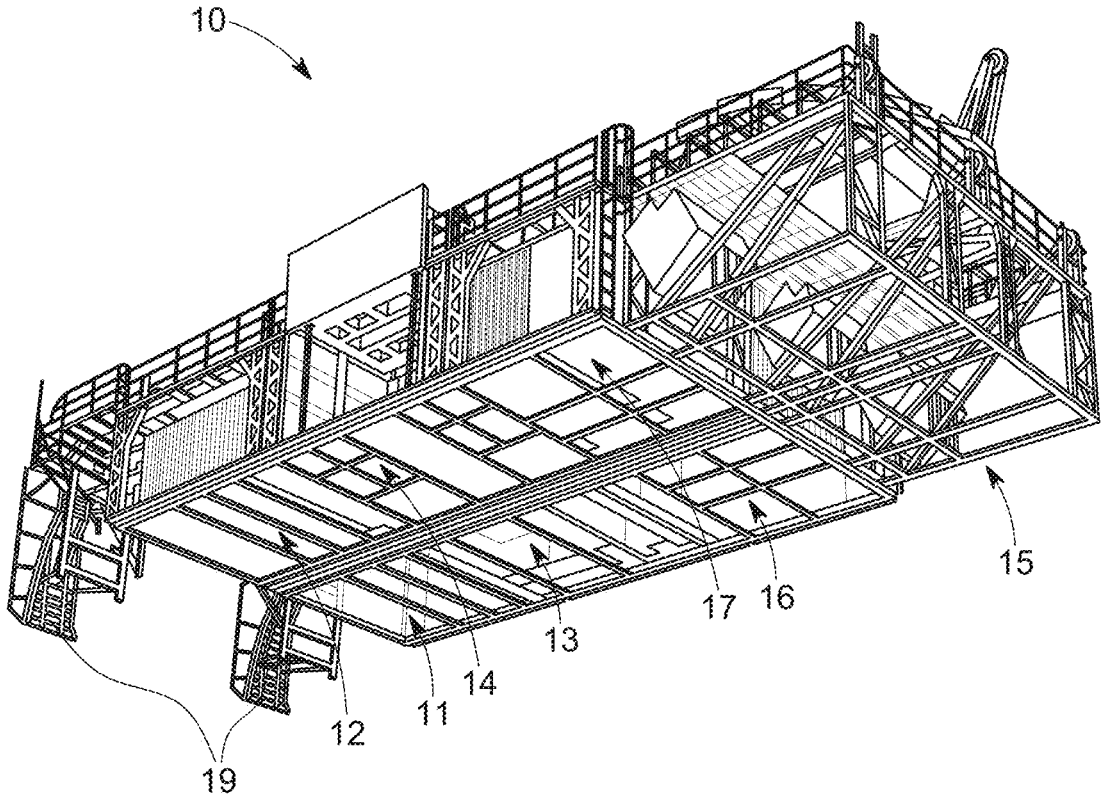
FIG. 2 illustrates a perspective view from below of the first embodiment of FIG. 1.
Figure 7:
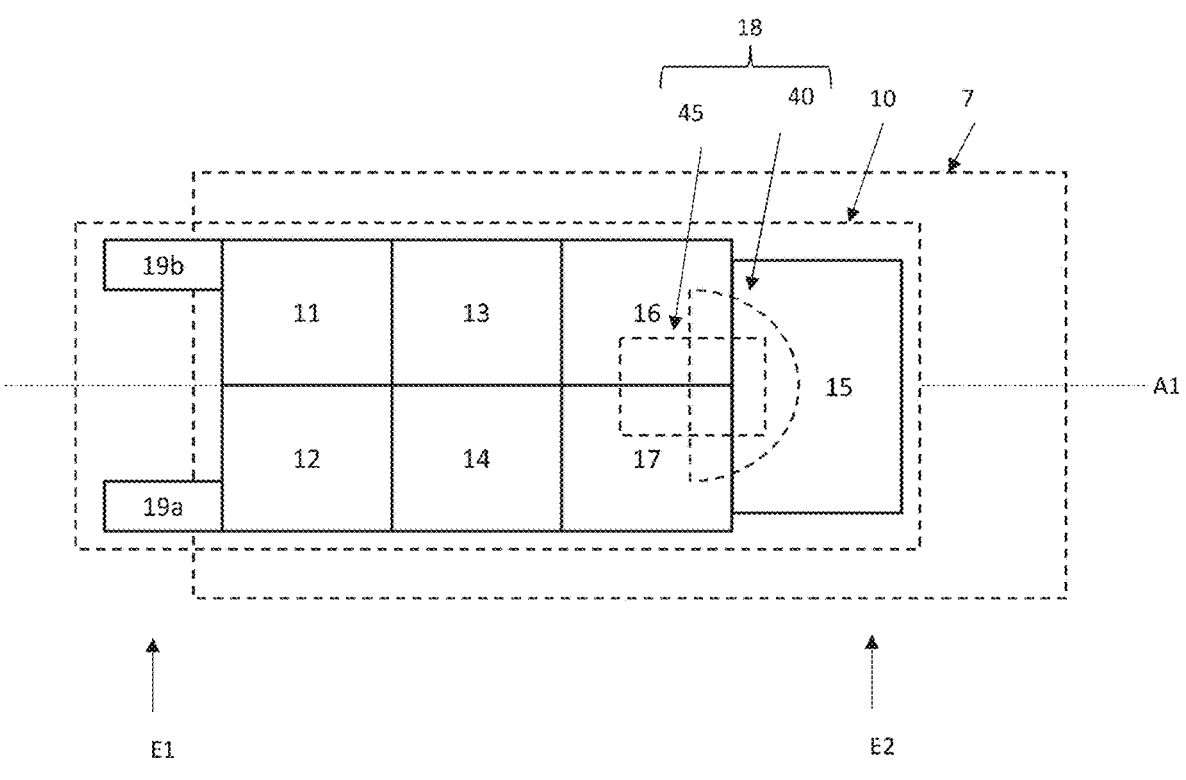
FIG. 7 illustrates a schematic top view of the first embodiment of FIGS. 1 and 2.

It is now referred to FIG. 1, FIG. 2 and FIG. 7. Here, from left to right, the work platform is shown to comprise two chutes 19, i.e. a first chute 19a and a second chute 19b, and a number of modules 11, 12, 13, 14, 16, 17, 15 located adjacent to each other on the vessel deck 7 of the vessel 5. As will be described further in detail below, the modules together will form a mezzanine deck 22 above the vessel deck 7 and a protective lower deck 23 below the mezzanine deck 22. On the mezzanine deck 22, an overboarding system 18 is provided.

As indicated in FIG. 7, the work platform 10 is defined with a first end E1 and a second end E2 in the opposite end of the first end E1. A central longitudinal axis A1 of the work platform 10 is defined as the central axis between the first end E1 and the second end E2 of the work platform 10.

The chutes 19 are guiding the cable 2 from the sea and onto the work platform 10. In the present embodiment, the chutes 19 are extending over the aft side 8 of the vessel 5. Hence, the first end E1 of the work platform 10 is located at the side 8 of the vessel 5. The chutes 19 are considered well known in the art, and will not be described further in detail below.

Below, the respective modules will be described in detail.

First Storage Module 11

Figure 8A:
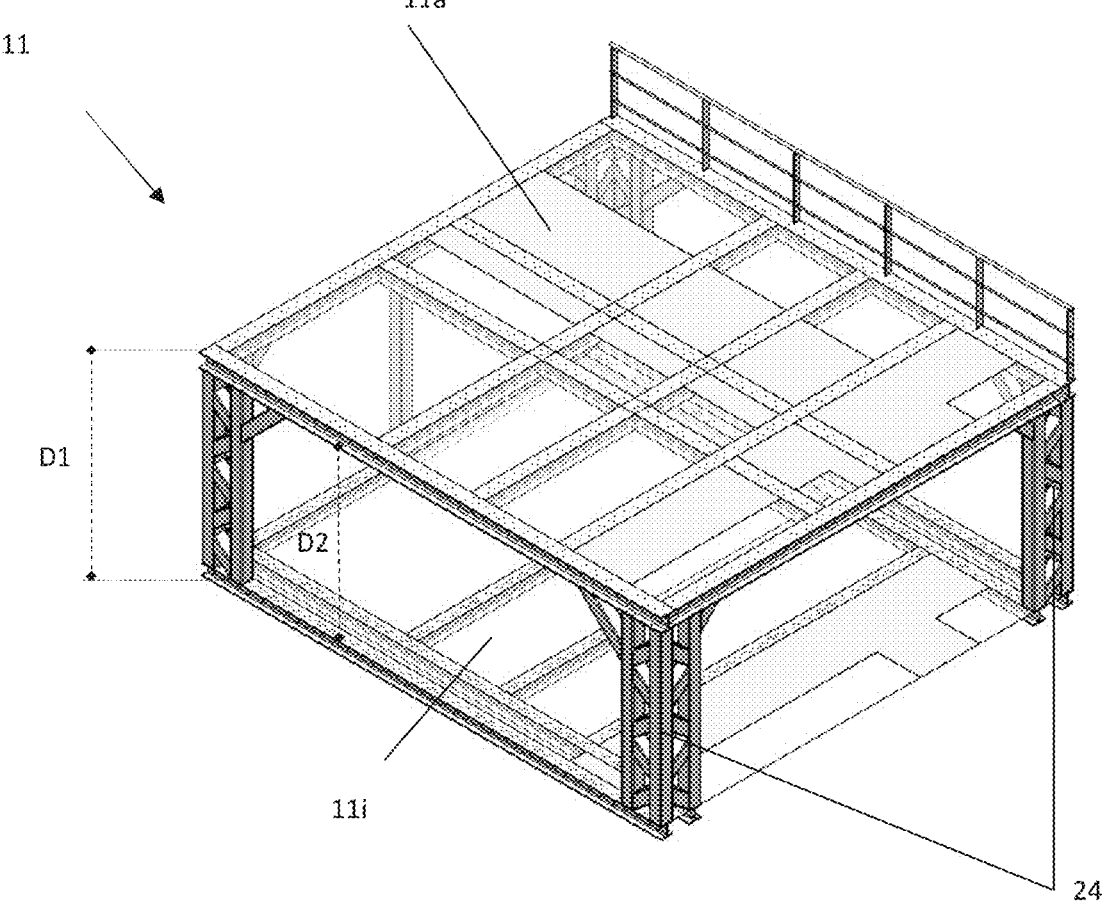
FIGS. 8a-g illustrate a perspective view of the modules.

It is now referred to FIG. 8a, in which a first storage module 11 is shown to comprise a deck section 11a and a support structure 24 for supporting the deck section 11a at a distance D1 above the vessel deck 7. The support structure 24 is adapted to be secured to the vessel deck 7, either by means of connection interfaces of the vessel deck, or by temporary welding.

The first storage module 11 further comprises an internal floor 11i located at a distance D2 below the deck section 11a.

Equipment for performing the cable operation is storable on the internal floor 11i below the deck section 11a of the first storage module 11.

In the present embodiment, the internal floor 11i is empty and forms a location at which equipment may be temporarily stored during the cable operation. However, the storage module 11 may comprise a storage container 30 (see FIG. 8b) in which equipment can be stored.

Second Storage Module 12

Figure 8B:
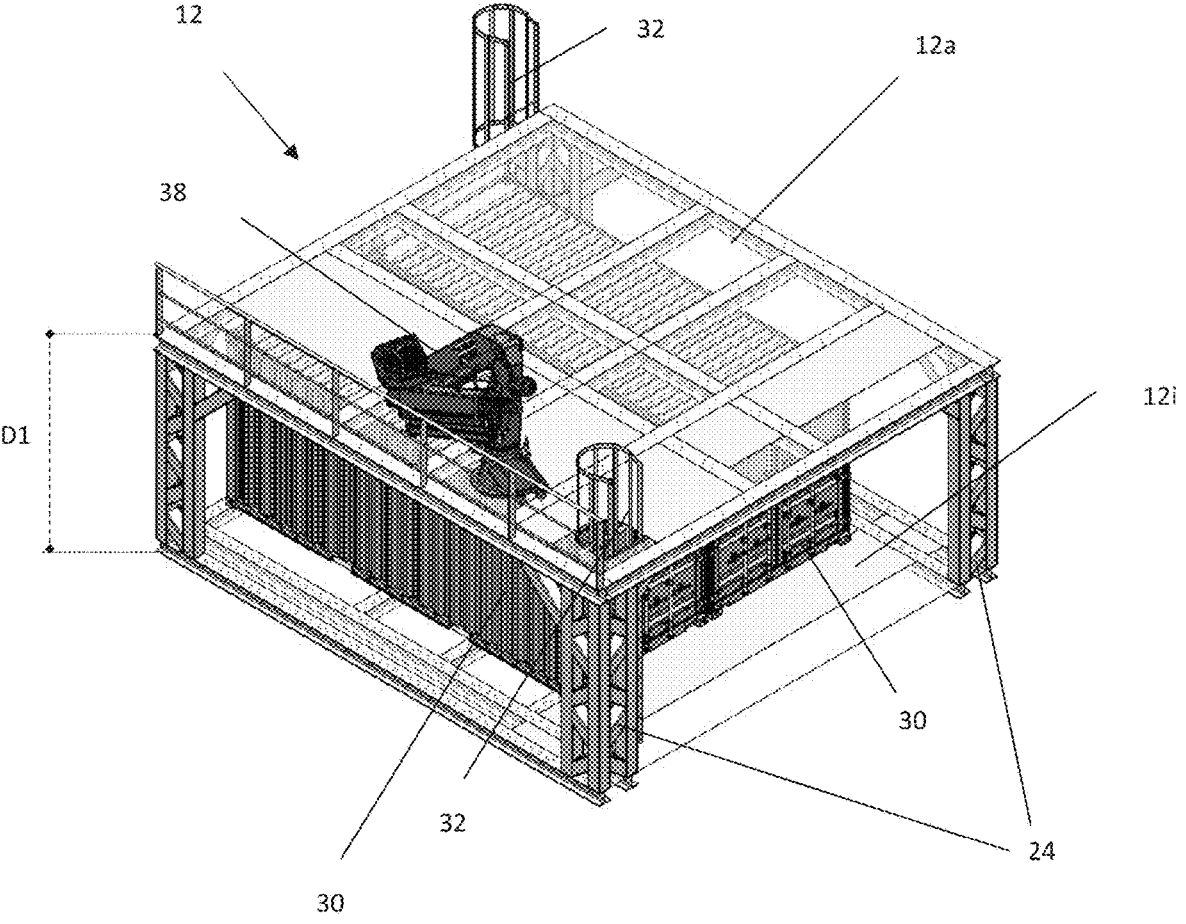

It is now referred to FIG. 8b, in which a second storage module 12 is shown to comprise a deck section 12a and a support structure 24 for supporting the deck section 12a at the distance D1 above the vessel deck 7. The support structure 24 is also here adapted to be secured to the vessel deck 7, either by means of connection interfaces of the vessel deck, or by temporary welding.

The second storage module 12 further comprises an internal floor 12i. Equipment for performing the cable operation is storable on the internal floor 12i below the deck section 12a of the second storage module 12.

In the present embodiment, two containers 30 are stored on the internal floor 12i. The containers 30 are here shipping containers secured to the internal floor 12i, to the support structure 24 and/or to the deck section 12a.

The second storage module 12 further comprises a crane 38 mounted to its deck section 12a. The crane 38 is configured to lift equipment between the modules (typically to and from the lift module which will be described below). In the present embodiment, the crane 38 has a range of up to 16-20 meters from its location on the deck section 12a.

The second storage module 12 further comprises a stair 32 allowing persons to move between the deck section 12a and the interior floor 12i.

Lift Module 13

Figure 8C:
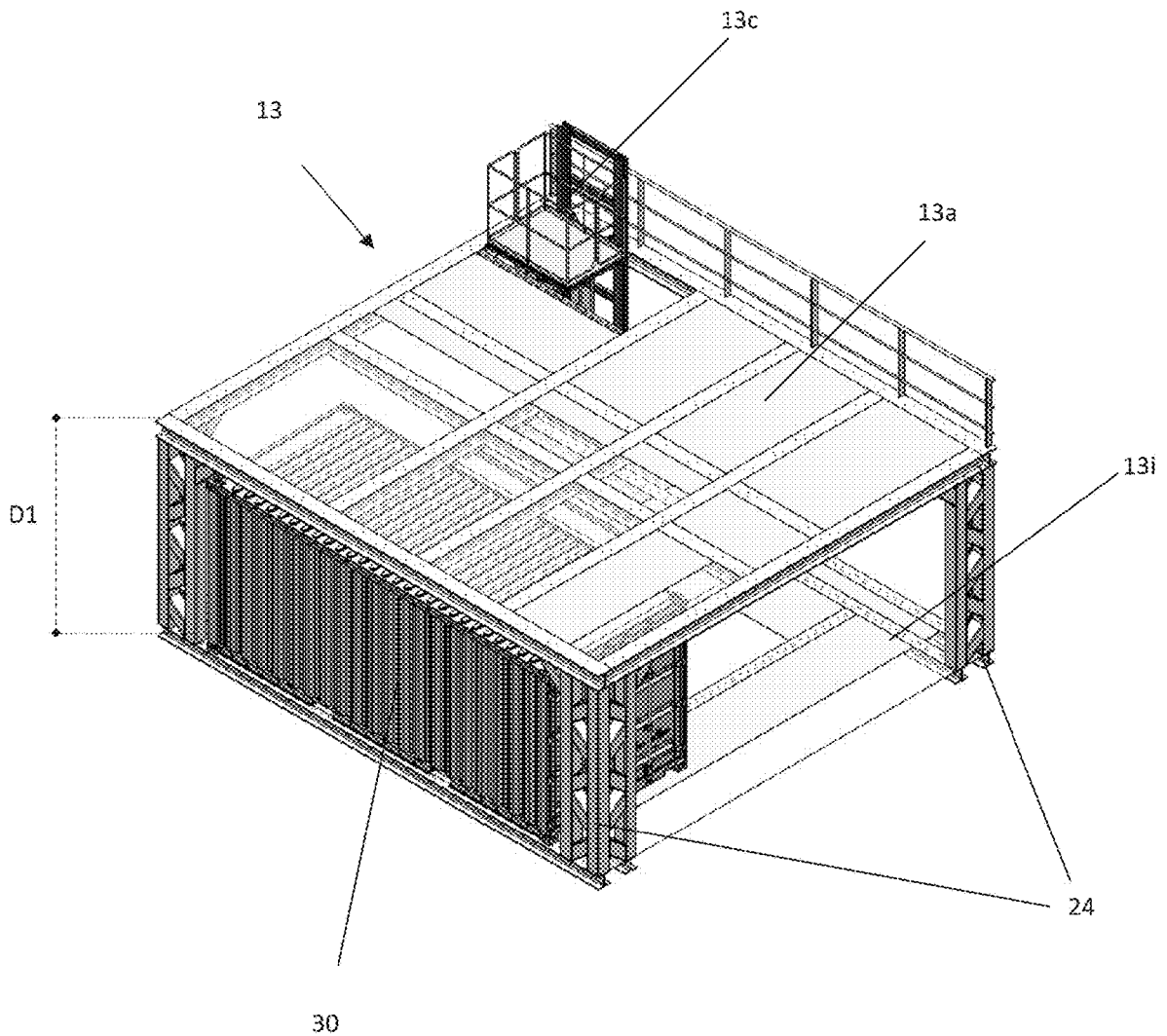

It is now referred to FIG. 8c, in which a lift module 13 is shown to comprise a deck section 13a and a support structure 24 for supporting the deck section 13a at the distance D1 above the vessel deck 7. The support structure 24 is also here adapted to be secured to the vessel deck 7, either by means of connection interfaces of the vessel deck, or by temporary welding.

The lift module 13 further comprises an internal floor 13i and a lift 13c configured to lift equipment between the internal floor 13i and the deck section 13a.

As shown in FIG. 8c, a container 30 may be stored on the internal floor 13i. Equipment for performing the cable operation is storable on the internal floor 13i or within the container 30.

Tensioner Module 14

Figure 8D:
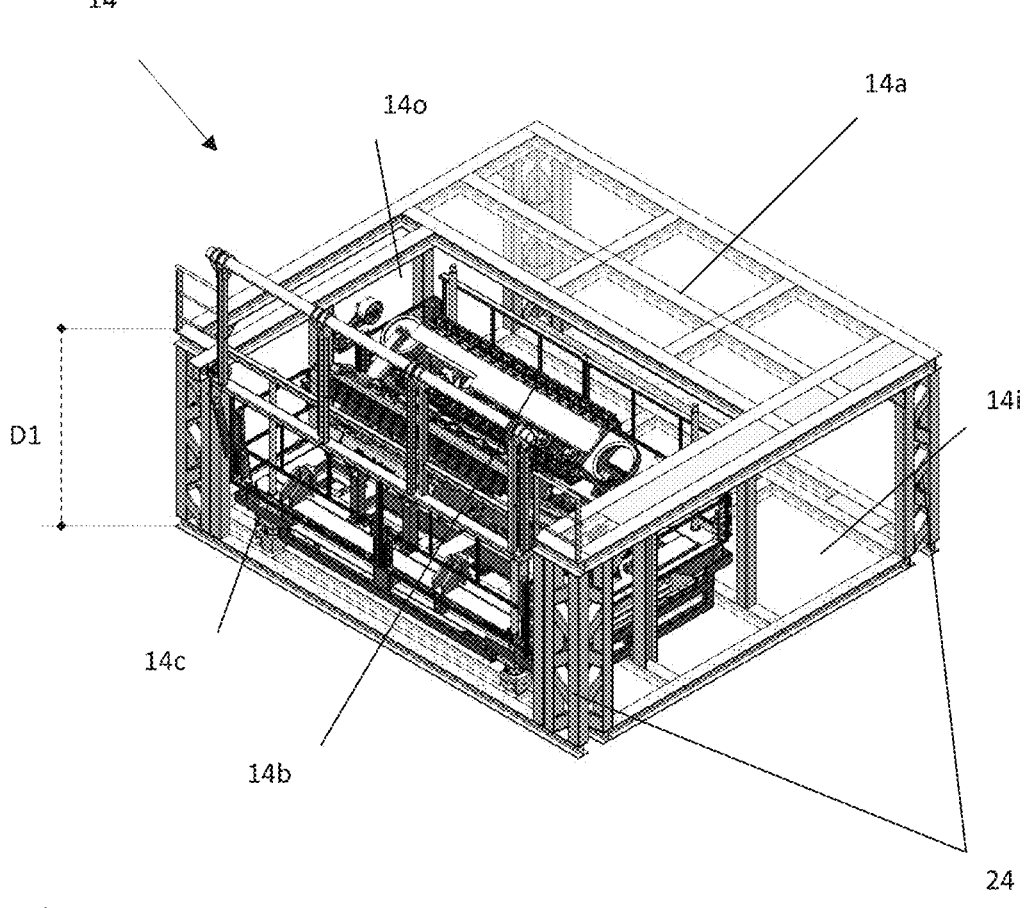

It is now referred to FIG. 8d, in which a tensioner module 14 is shown to comprise a deck section 14a and a support structure 24 for supporting the deck section 14a at the distance D1 above the vessel deck 7. The support structure 24 is also here adapted to be secured to the vessel deck 7, either by means of connection interfaces of the vessel deck, or by temporary welding.

The tensioner module 14 further comprises an internal floor 14i, a tensioner lift 14c and a cable tensioner 14b, wherein the tensioner lift 14c is configured to lift the cable tensioner 14b between a position above the deck section 14a of the tensioner module 14 and a position below the deck section 14a of the tensioner module 14.

Hence, when not in use, the tensioner 14b can be removed from the mezzanine deck 22 in an efficient way to free up space on the deck section 14a.

The tensioner lift 14c is considered prior art, and will not be described further in detail.

The deck section 14a has an opening 140 allowing the tensioner 14b to be lifted through the deck section 14a. When the tensioner 15b is lowered, the opening can be covered by a cover (not shown) to avoid fall injuries.

Winch Module 15

Figure 8E:
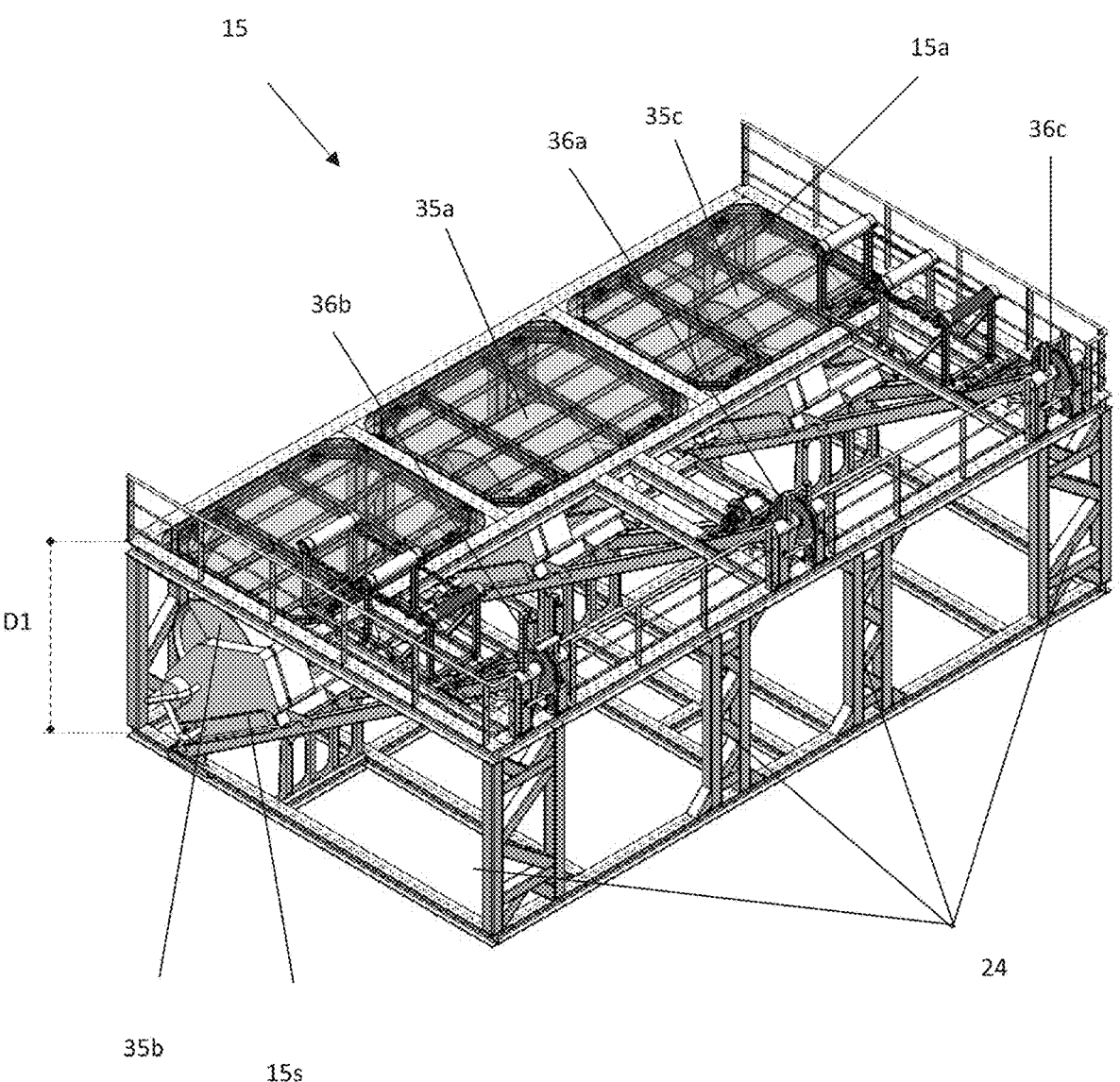

It is now referred to FIG. 8e, in which a winch module 15 is shown to comprise a deck section 15a and a support structure 24 for supporting the deck section 15a at the distance D1 above the vessel deck 7. The support structure 24 is also here adapted to be secured to the vessel deck 7, either by means of connection interfaces of the vessel deck, or by temporary welding.

In the present embodiment, the deck section 15*a* is not covering the entire upper part of the winch module 15 and the winch module 15 does not comprise an internal floor.

The winch module 15 comprises a winch support 15*s* for supporting three winches 35*a*, 35*b*, 35*c* in a position below the deck section 15*a* of the winch module 15.

In the present embodiment, the winch module 15 itself comprises the winches. However, in an alternative embodiment, the winches 35*a*, 35*b*, 35*c* are considered separate units that are lifted into the winch support 15*a*.

The winch module 15 further comprises sheaves 36*a*, 36*b*, 36*c* for routing winch wires from the winches 35*a*, 35*b*, 35*c* to a location above the deck section 15*a*.

In the present embodiment, the first winch 35*a* is located between the second winch 35*b* and the third winch 35*c*.

The first winch 35*a* is primarily used by the overboarding system 18, which will be described in detail below.

Figure 10:
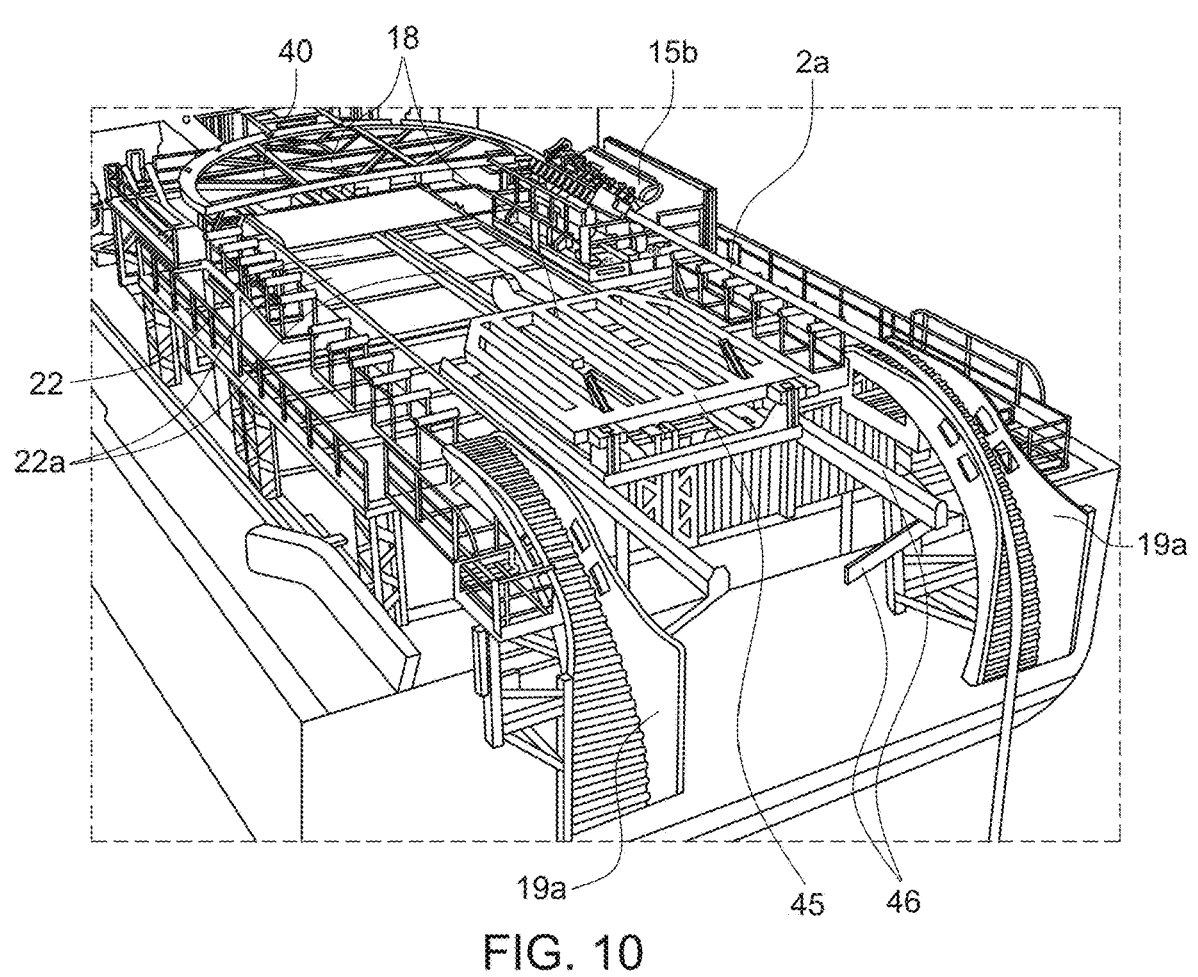
FIG. 10 illustrates that a cable section is pulled up from the sea and onto the mezzanine deck.

The second winch 35*b* is primarily used to lift an end of a first cable section from the sea and up to the mezzanine deck 22 via the first one of the chutes 19. In the present embodiment, the second winch 35*b* is used to lift an end of a first cable section up to the tensioner module 14. In FIG. 10, it is shown that an end of a first cable section 2*a* has been pulled up to the tensioner module 14 via the first chute 19.

Figure 11:
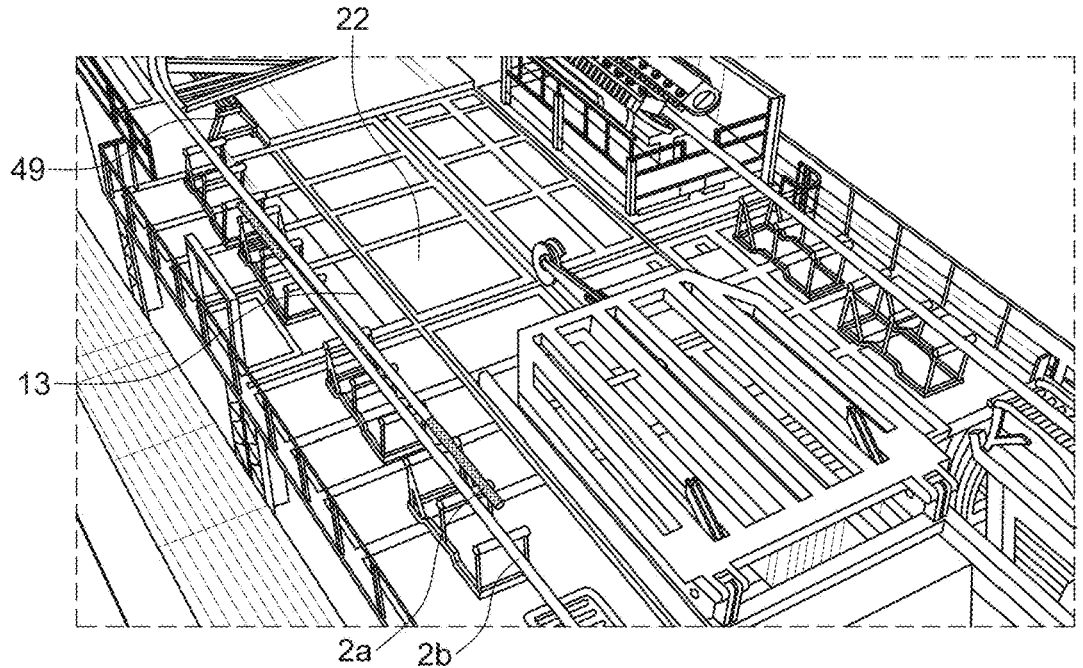
FIG. 11 illustrates that a second cable section is located next to the first cable section as a preparation for a cable operation where the first cable section and the second cable section are joined.

The third winch 35*c* is primarily used to lift an end of a second cable section from the sea and up to the mezzanine deck 22 via the second one of the chutes 19. In the present embodiment, the third winch 35*c* is used to lift an end of a second cable section up to the lift module 13. In FIG. 11, it is shown that an end of a second cable section 2*b* has been pulled up to the lift module 13 via the second chute (not shown in FIG. 11, but shown in FIG. 10). Here, the first cable section 2*a* of FIG. 10 has been pulled around the bow 40 by means of the tensioner 15*b*. Hence, the two cable sections are overlapping each other on the mezzanine deck, typically for the purpose of joining the two cable sections into one cable.

Additional Modules 16, 17

Figure 8F:
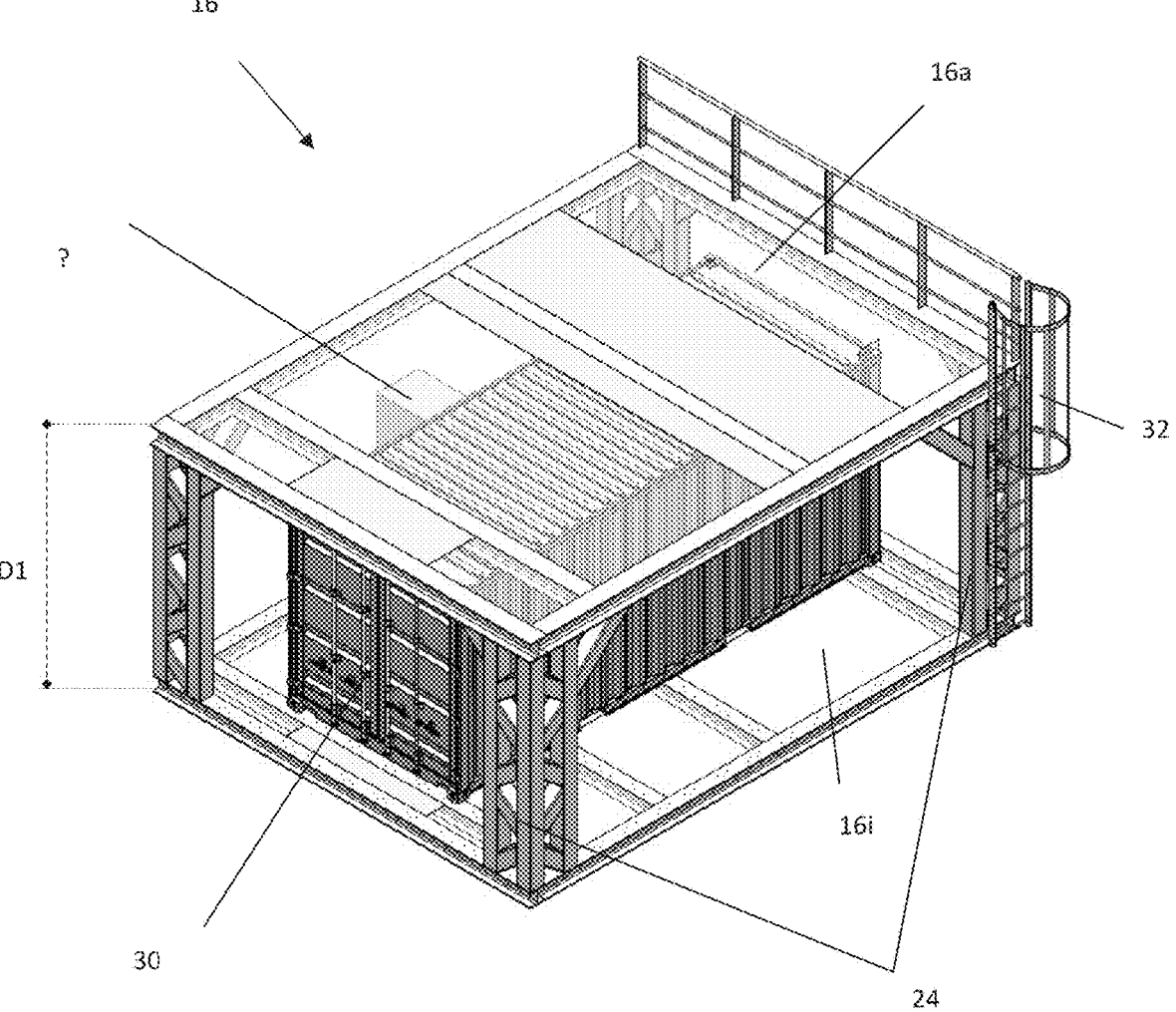
Figure 8G:
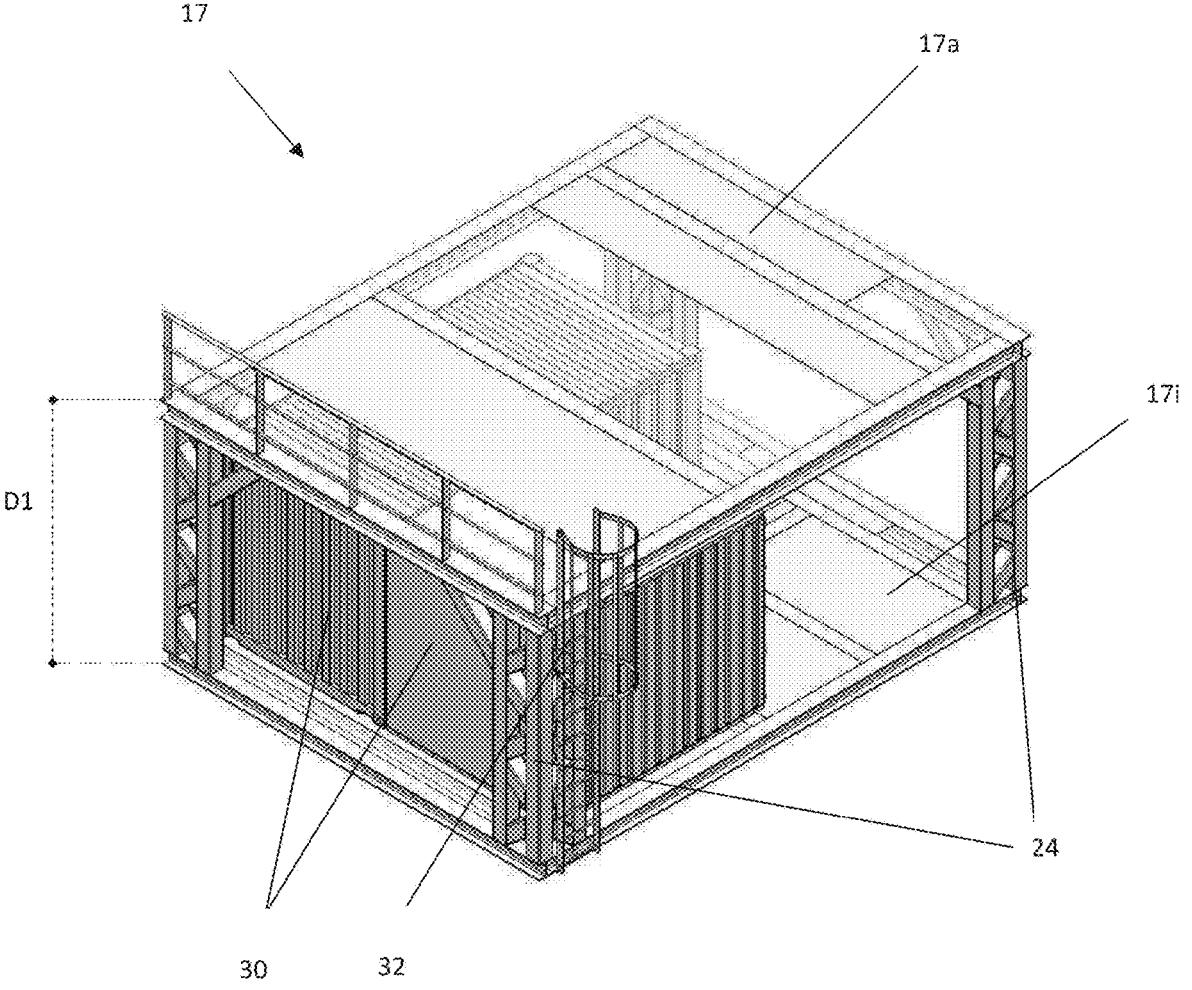

It is now referred to FIG. 8*f* in which a first additional module 16 is shown and FIG. 8*g*, in which a second additional module 17 is shown.

Each additional module 16, 17 comprises a deck section 16*a*, 17*a* and a support structure 24 for supporting the deck section 16*a*, 17*a* at the distance D1 above the vessel deck 7. The support structure 24 is also here adapted to be secured to the vessel deck 7, either by means of connection interfaces of the vessel deck, or by temporary welding.

Each additional module 16, 17 further comprises an internal floor 16*i*, 17*i*. On the internal floor 16*i* of the first additional module 16, a container 30 is located. On the internal floor 17*i* of the second additional module 17, two containers 30 having different sizes are located.

Each additional module 16, 17 further comprises stair 32 similar to the stairs of the storage modules.

Assembled Modules

The modules described above have a size and weight which allow each module to be lifted separately onto and away from the vessel deck 7. In the present embodiment, the modules have a width of ca 7 meters and a length of ca 7 meters. Each module has a weight of ca 15 tons, without any equipment (i.e. without the tensioner 15*b*, without containers 30, without winches etc.).

It is now referred to FIG. 7 again. Here it is shown that the second storage module 12 is located adjacent to a first one 19*a* of the chutes 19 and that the first storage module 11 is located adjacent to a second one 19*b* of the chutes 19. The interface between the first and second storage modules 11, 12 is aligned with the longitudinal center axis A1. The next two modules are the lift module 13, which in a direction along the axis A1 is adjacent to the first storage module 11 and the tensioner module 14, which along the axis A1 is adjacent to the second storage module 12. The next two modules are the additional modules 16, 17. Finally, in the second end E2, the winch module is located adjacent to the additional modules. As is shown, the winch module 15 has a width (measured perpendicular to the axis A1) which is larger than the width of the other modules. One reason for this is that it is desired to have the first winch 35*a* supported along the center axis A1, as this first winch is operating the overboarding system 18.

The deck sections 11*a*, 12*a*, 13*a*, 14*a*, 15*a*, 16*a*, 17*a* of the modules together form the mezzanine deck 22 on which the cable operation is performed when the modules are assembled adjacent to each other. In addition, the internal floor 11*i*, 12*i*, 13*i*, 14*i*, 16*i*, 17*i* together form the protected lower deck 23 below the mezzanine deck 22.

When modules 11, 12, 13, 14, 15 are used, the area of the vessel deck 7 occupied by these modules must be approximately 23 (longitudinal direction)×15 (cross direction) meters. When modules 11, 12, 13, 14, 15, 16, 17 are used, an additional length of 5-6 meters is required in the longitudinal direction. For many cable operations, an additional turntable has to be positioned on the vessel deck, this requires an additional 15×10 meters.

Typical vessels that can use the above work platform 10 are smaller PSVs (platform supply vessels), AHVs (anchor handling vessels), LCVs (light construction vessels), TSVs (trans shipment vessels) with minimum approximately 650 m2 free deck area. No further vessel area is required, as preferably all equipment for performing the cable operation is stored on the protected lower deck 23 below the mezzanine deck 22 and can be moved between the protected lower deck 23 and the mezzanine deck 22 in an efficient way by means of the lift of the lift module 13.

As there are more vessels of the above type it is considered easier to mobilize a vessel in short time.

Moreover, it is possible to have the above modules in standby in a port, where they can be pre-mobilized during the time it takes for the mobilized vessel to arrive. Moreover, it will take relatively short time to lift the modules onto the vessel deck and temporarily install them on the vessel deck.

Optionally, grillages with quick locks may be provided for securing the modules on the vessel deck.

In a particular embodiment, grillages and modules may be fitted with connectors to ensure correct position and securing of the modules when landed on the grillages.

During mobilisation of the vessel, the grillages may be lifted onboard the vessel deck, grillages may be welded to deck using brackets, e.g. by means of conventional sea fastening and the modules may then be lifted onboard and landed on the grillages so that the connectors mate. The connectors are then locked, securing the modules to the grillages.

Overboarding System 18

Figure 12:
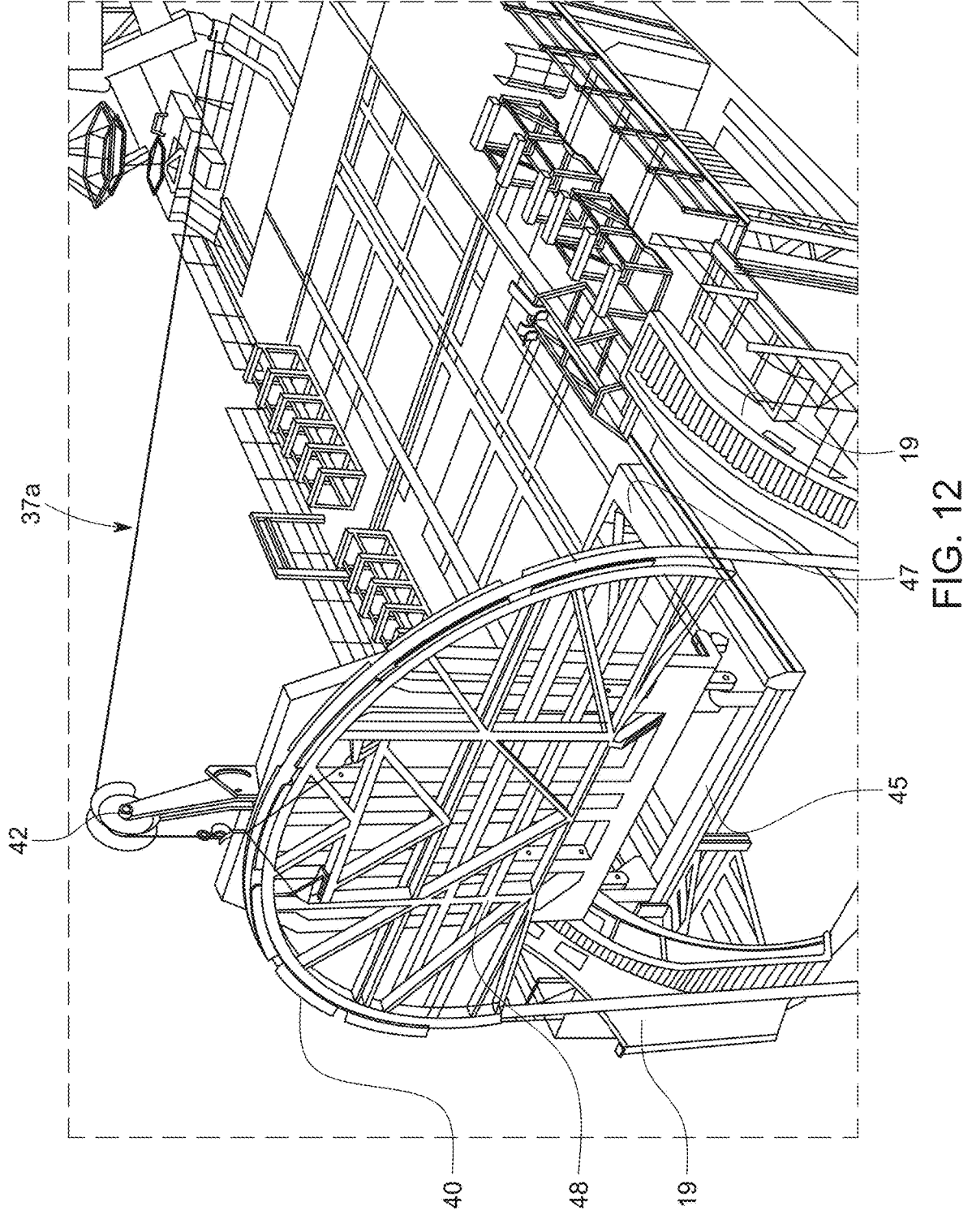
FIG. 12 illustrates how the winch wire of the first winch is connected to the cable handling bow.

It is now referred to FIGS. 10, 11 and 12. Here it is shown that the overboarding system 18 is supported on top of the mezzanine deck 22. It should further be noted that parts of the overboarding system 18 may be secured directly to deck or to the side of the vessel 7, as indicated by supporting beams 46 in FIG. 10.

The overboarding system 18 comprises two main "units" in the form of a cable handling bow 40 and a tilting device 45. It should be noted that most of the features of the cable handling bow 40 and the tilting device 45 are considered known for a person skilled in the art, as these features are used on prior art special-purpose vessels.

The cable handling bow 40 is a bow which allows a cable to be turned 180° at an acceptable bending radius, i.e. the cable is allowed to arrive from the sea and up one of the chutes and further around the cable handling bow 40 and then return to the sea via the other one of the chutes.

The cable handling bow 40 is horizontally movable on the mezzanine deck, either by means of trolleys 49, and/or by means of the tilting device 45.

The tilting device 45 comprises a base frame 47 which is supported on rails 22*a* on the mezzanine deck 22 and a bow supporting frame 48 which is tiltable relative to the base frame 47. Hence, when the bow 40 is supported by the bow supporting frame 48, it can be tilted from a horizontal position to a vertical position in order to lower the bow 40 into the sea. Similarly, the bow supporting frame 48 is tilted to a vertical position when receiving the bow 40 from the sea. The horizontal movement of the tilting device 45 is done to move the bow 40 clear of the chutes during its vertical movement to and from the sea.

In prior art, the bow 40 is lifted from the bow supporting frame 48 to and from the sea by means of a crane installed on the vessel.

In the present embodiment, the bow supporting frame 48 comprises a sheave 42 faced towards the winch module 15 when the bow supporting frame 48 is in the horizontal position and provided in the upper part of the bow supporting frame 48 when the bow supporting frame 48 is in the vertical position. This is shown in FIGS. 10 and 11 (bow supporting frame 48 in horizontal position) and FIG. 12 (bow supporting frame 48 in vertical position).

The winch wire 37*a* of the first winch 35*a* is routed between the cable handling bow 40 and the first one 35*b* of the winches via the sheave 42 and via the sheave 36*a* of the winch module 15.

According to the above, the vessel needed to perform the cable operation does not need a crane, which again increases the types of vessels that can be used for the cable operation by means of the present work platform 10.

Alternative Embodiments

It should be noted that there are two purposes of the modules. The first one is to form a deck section 22 by means of their deck sections which is sufficiently large to perform a cable operation. The second one is to be able to store equipment below the mezzanine deck 22.

Figure 3:
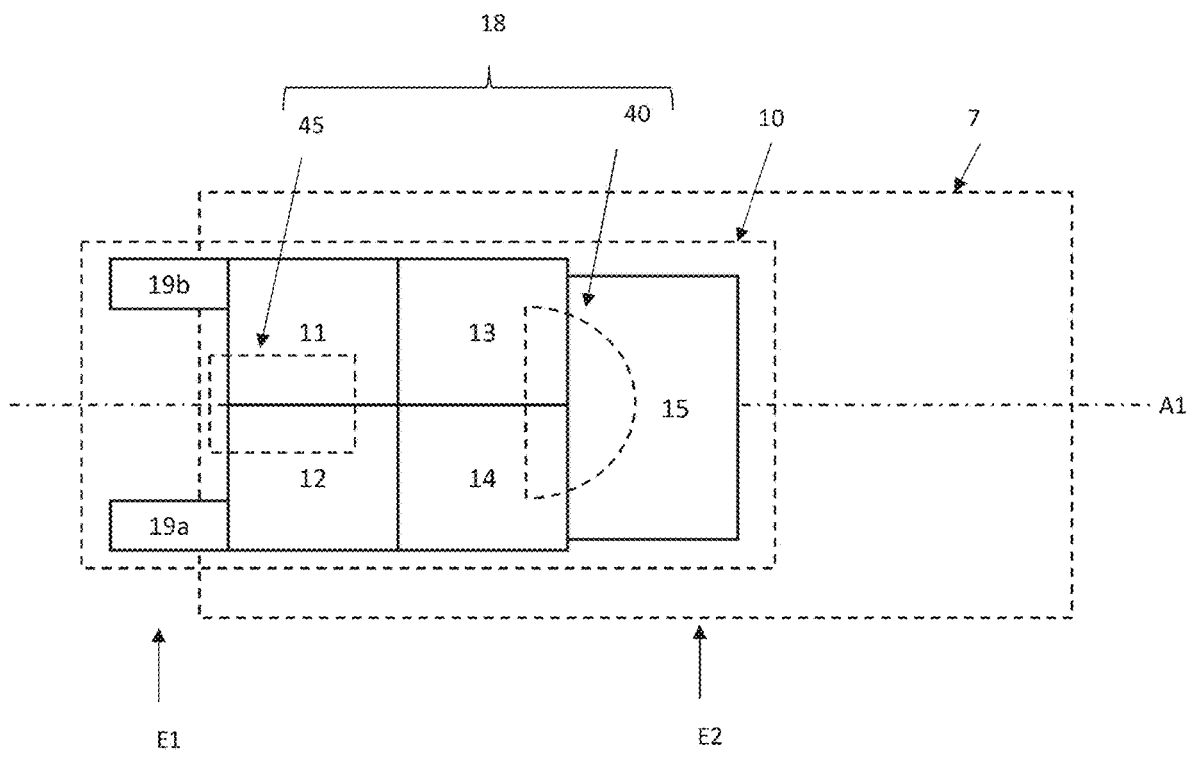
FIG. 3 illustrates a schematic top view of a second embodiment of the work platform.
Figure 4:
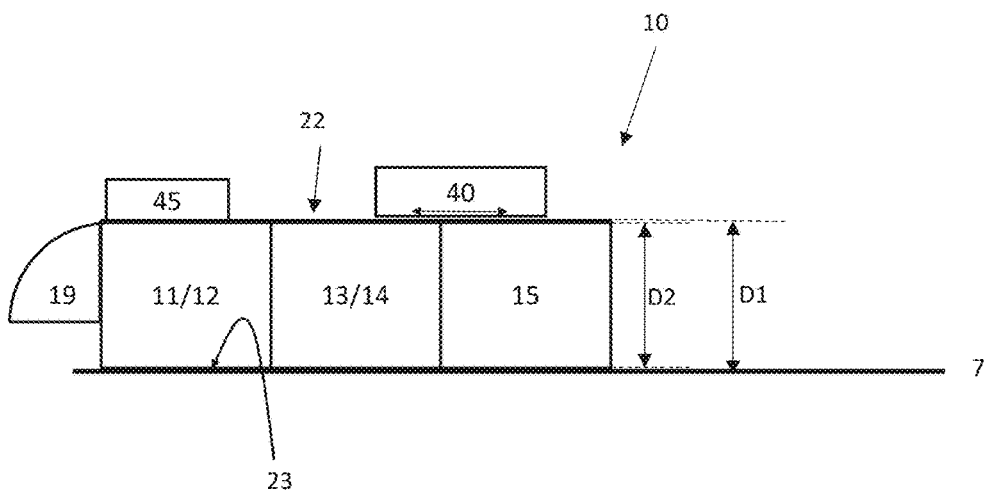
FIG. 4 illustrates a schematic side view of the embodiment of FIG. 3.
Figure 5:
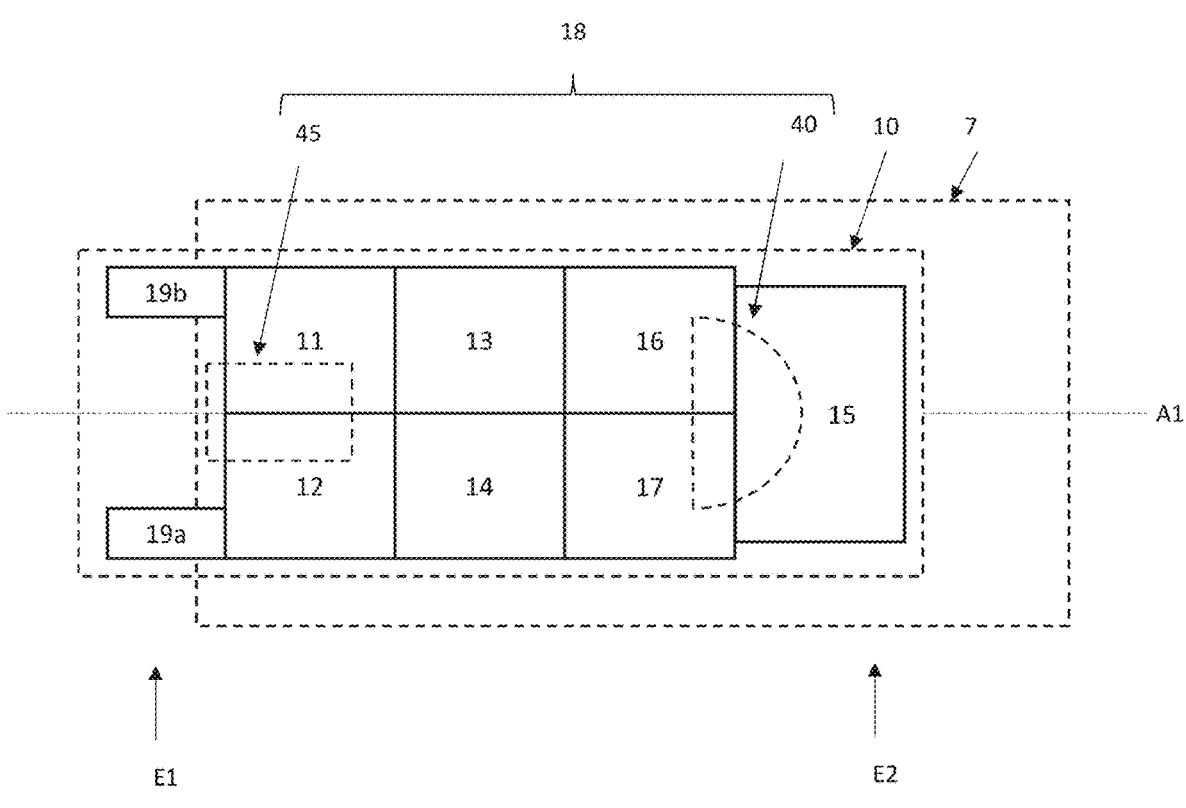
FIG. 5 illustrates a schematic top view of a third embodiment of the work platform.
Figure 6:
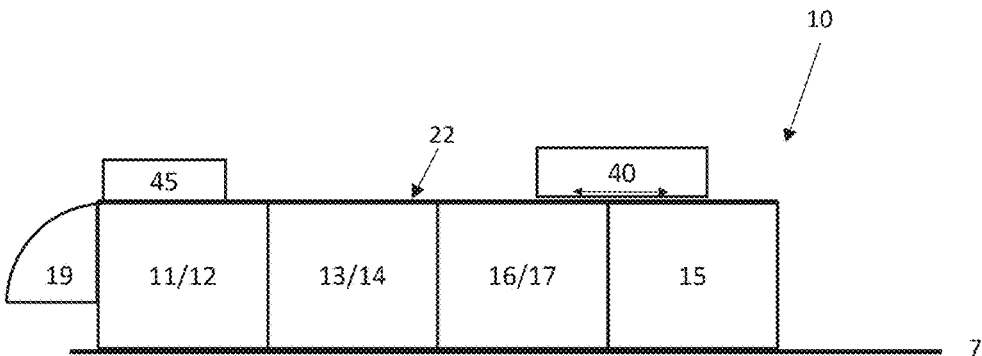
FIG. 6 illustrates a schematic side view of the embodiment of FIG. 4.

The additional modules 16, 17 are needed when an extra area of the mezzanine deck 22 is required, for example when joining oil-filled cable sections. Hence, for some operations, the additional modules 16, 17 are not required. FIGS. 3 and 4 illustrate how the modules may be arranged when the additional modules 16, 17 are not required. FIGS. 5 and 6 illustrate how the modules may be arranged when the additional modules 16, 17 are required. In FIG. 5 and FIG. 6 it is shown that the first additional module 16 is located between the lift module 13 and the winch module 15 and that the second additional module 17 is located between the tensioner module 14 and the winch module 15.

In the embodiment of FIGS. 1, 2 and 7, the tilting device 45 is horizontally movable along the entire mezzanine deck 22. Hence, the bow 40 is supported also by the tilting device 45 when the bow 40 is closest to the winch module, which is the position used when performing joining operations etc.

In the embodiment of FIGS. 3, 4, 10, 11 and 12, the tilting device 45 is located adjacent to the chutes while the bow 40 is supported on trolleys. Here, the bow 40 is moved to and from the tilting device 45 on these trolleys.

Figure 13:
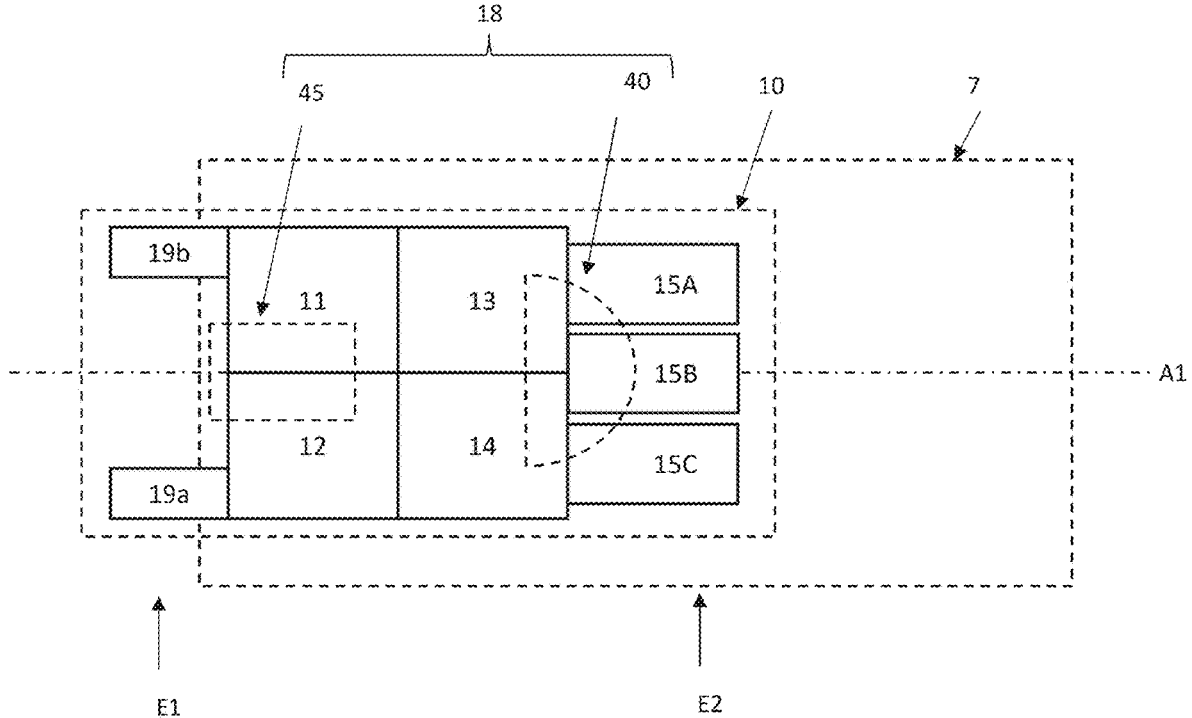
FIG. 13 illustrates a schematic top view of an embodiment with three separate winch modules.

Yet another alternative embodiment will be described with reference to FIG. 13. Instead of one single winch module 15 as in the above embodiment, FIG. 13 shows that the work platform 10 comprises three winch modules 15A, 15B, 15C. Each winch module 15A, 15B, 15C here comprises a winch support 15*s* and a winch, respectively 35*a*, 35*b*, 35*c*, supported by the winch support 15*s* in a position below the deck section 15*a* of the respective winch module 15A, 15B, 15C. Each winch module also comprises a sheave, respectively 36*a*, 36*b*, 36*c*, for routing winch wires from the respective winches 35*a*, 35*b*, 35*c* to the mezzanine deck 22.

The invention claimed is:

1. A work platform for performing a cable operation on a cable on a vessel having a
   - vessel deck, wherein the work platform comprises:
     - chutes for guiding the cable from the sea and onto the work platform, wherein the chutes are provided in a first end of the work platform;
     - an overboarding system;
     - a number of modules, wherein each module comprises a deck section and a support structure for supporting the deck section at a distance above the vessel deck,
   - wherein
     - each module is configured to be lifted separately onto and away from the vessel deck;
     - wherein the deck sections of the modules together form a mezzanine deck on which the
     - cable operation is performed;
     - wherein the overboarding system is secured to the mezzanine deck;
   - wherein at least some of the equipment for performing the cable operation is stored below the mezzanine deck.

2. The work platform according to claim 1, wherein one of the modules is a tensioner
   - module comprising a tensioner lift and equipment in the form of a cable tensioner, wherein the tensioner lift is configured to lift the cable tensioner between a position above the deck section of the tensioner module and a position below the deck section of the tensioner module.

3. The work platform according to claim 2, wherein one of the modules is a second storage module in which at least some of the equipment is storable below the deck section of the second storage module, wherein the second storage module is located between the tensioner module and the chutes, and wherein one of the modules is a second storage module in which at least some of the equipment is storable below the deck section of the second storage module.

4. The work platform according to claim 1, wherein one of the modules is a first storage module in which at least some of the equipment is storable below the deck section of the first storage module.

5. The work platform according to claim 4, wherein the first storage module is located
   - adjacent to a second one of the chutes.

6. The work platform according to claim 4, wherein one of the modules is a second storage module in which at least some of the equipment is storable below the deck section of the second storage module, wherein the first storage module or the second storage module comprises a crane mounted to its deck section, and wherein one of the modules is a second storage module in which at least some of the equipment is storable below the deck section of the second storage module.

7. The work platform according to claim 1, wherein one of the modules is a second
    storage module in which at least some of the equipment is storable below the deck section of the second storage module.

8. The work platform according to claim 7, wherein the second storage module is
    located adjacent to a first one of the chutes.

9. The work platform according to claim 1, wherein one of the modules is a lift module
    comprising a lift, wherein the lift is configured to lift equipment below the mezzanine deck between a position above the deck section of the lift module and a position below the deck section of the lift module.

10. The work platform according to claim 9, wherein one of the modules is a first storage module in which at least some of the equipment is storable below the deck section of the first storage module, and wherein the first storage module is located
    between the lift module and the chutes.

11. The work platform according to claim 1, wherein the work platform comprises
    winches; and wherein one of the modules is a winch module comprising a winch support for supporting at least one of the winches in a position below the deck section of the winch module, wherein the winch module is located in a second end of the work platform opposite of the first end.

12. The work platform according to claim 11, wherein the overboarding system comprises:
    a cable handling bow connected to a winch wire of a first one of the winches;
    a tilting device comprising a base frame supported on the mezzanine deck and a bow
    supporting frame pivotably connected to the base frame; wherein the bow supporting
    frame comprises a sheave; wherein a winch wire of the first winch is configured to be
    guided between the cable handling bow and the first one of the winches via the sheave.

13. The work platform according to claim 11, wherein the winch support comprises a
    sheave for each winch for routing winch wires from the respective winches to the mezzanine deck.

14. The work platform according to claim 1, wherein three of the modules are winch
    modules, wherein each winch module comprises a winch support and a winch supported by the winch support in a position below the deck section of the respective winch module.

15. The work platform according to claim 1, wherein the work platform comprises: an
    additional module comprising a deck section and a support structure for supporting the deck section at the distance above the vessel deck, wherein the additional module is configured to be lifted separately onto and away from the vessel deck; and wherein the deck sections of the additional module together with the other deck sections form the mezzanine deck on which the cable operation is performed.

\* \* \* \* \*